Jan. 19, 1960
R. W. HOHL
2,921,377
GAUGE SETTING DEVICE
Filed Nov. 19, 1958
2 Sheets-Sheet 1
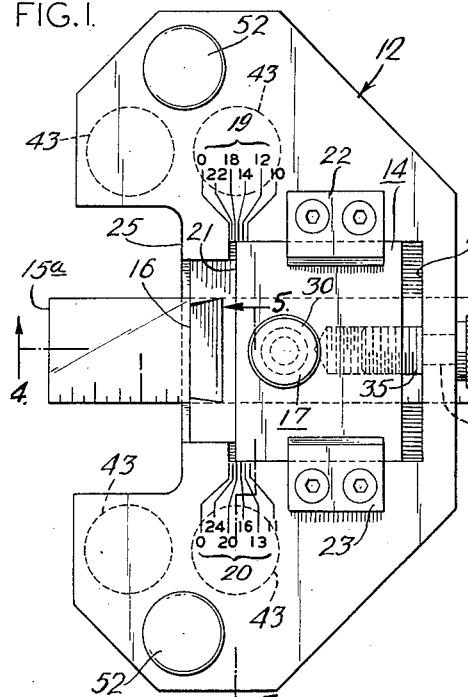
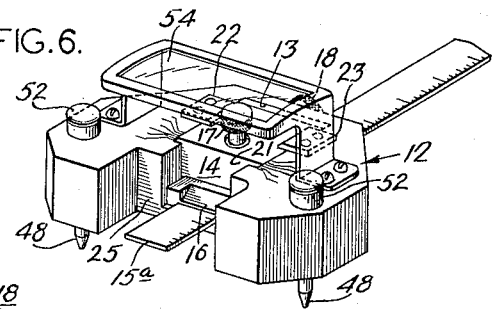
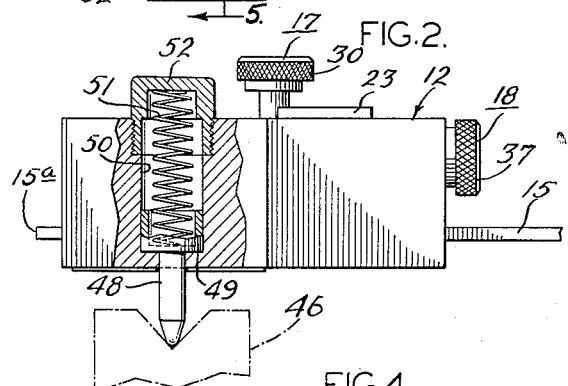
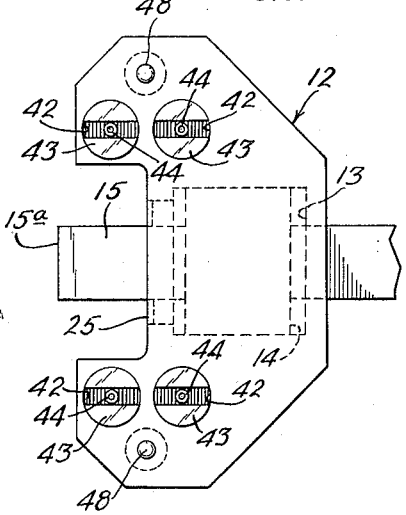
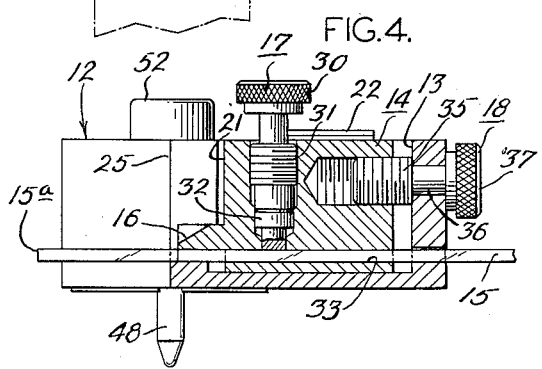
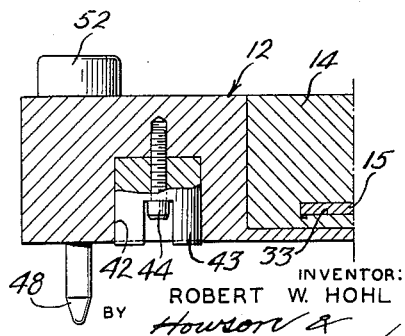
INVENTOR:
ROBERT W. HOHL
BY Howson & Howson
ATTYS.

Jan. 19, 1960   R. W. HOHL   2,921,377
GAUGE SETTING DEVICE
Filed Nov. 19, 1958   2 Sheets-Sheet 2
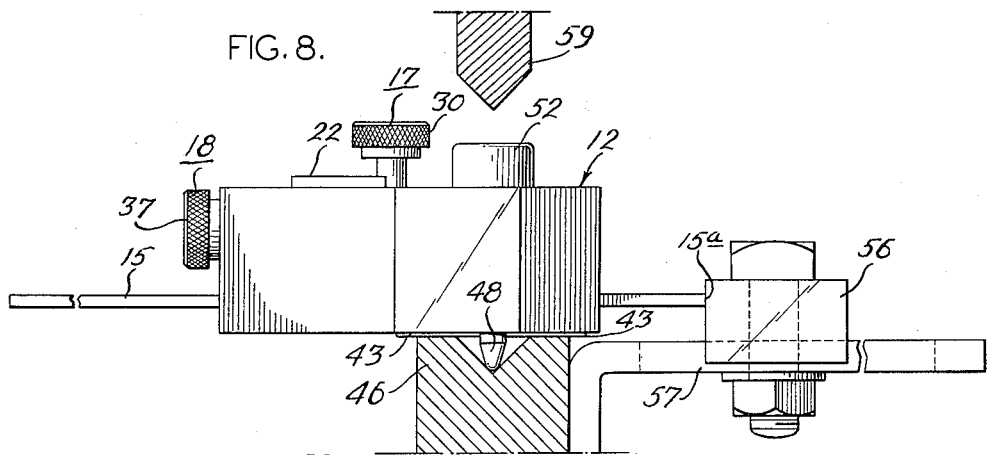
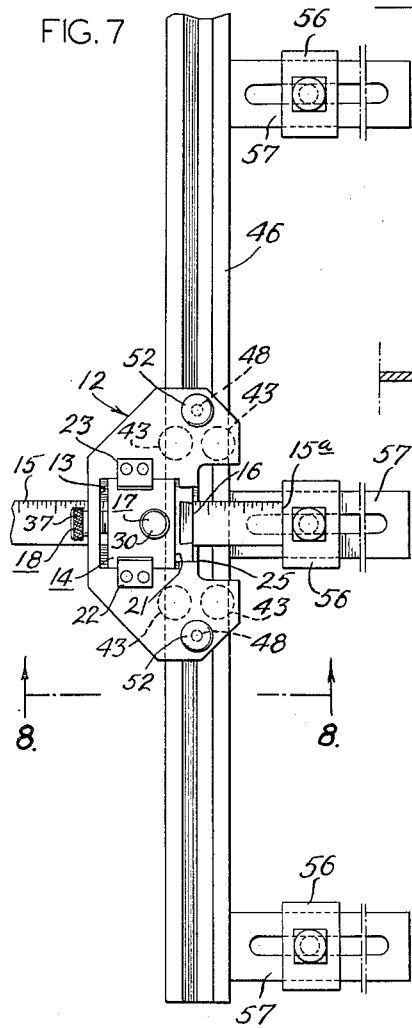
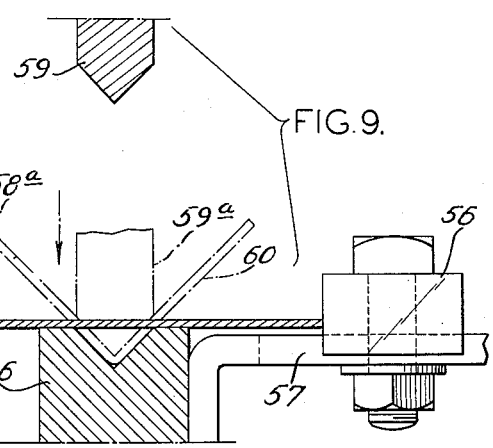
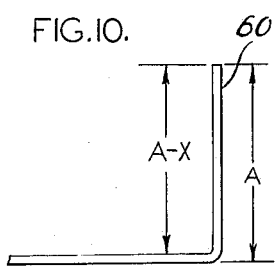
INVENTOR:
ROBERT W. HOHL
BY Howson & Howson
ATTYS.

United States Patent Office

2,921,377
Patented Jan. 19, 1960

2,921,377

GAUGE SETTING DEVICE

Robert W. Hohl, Glenside, Pa., assignor to Standard Pressed Steel Co., Jenkintown, Pa., a corporation of Pennsylvania Application November 19, 1958, Serial No. 775,047

5 Claims. (Cl. 33—181)

The present invention relates to a device for setting up sheet metal working apparatus, and more particularly relates to a device for setting the gauges or stops on a press brake to form flanges of a predetermined height.

When forming flanges having a predetermined height, between upper and lower dies, the distance from the end of the flange to the center line of the upper and lower dies must be equal to the desired flange height less one metal thickness, plus the bend allowance. For example, to bend a one-inch flange on material having a thickness of .062 the distance from the free end of the flange to the center line of the upper and lower brake dies must be .950 inch, the square bend allowance being .012.

The standard procedure for setting up a press brake is to determine the necessary distance, etc. as above, and scribe a line on a piece of sheet material. The material is then set in the press brake so that the line scribed on the material registers with the center line of the upper and lower dies. The gauges or stops of the press brake are then set against the edge of the material and the flange is formed by operating the brake. In the majority of cases, the first setting of the gauges or stops will not be precisely correct due to the difficulty of registering the center lines of the upper and lower dies with the scribed line. As a result of the inherent inaccuracy of this method, it is necessary to make several adjustments, each using a fresh piece of sheet material in order to obtain the necessary accuracy. Thus the standard procedure is not only wasteful of time and effort but also is wasteful of material.

With the foregoing in mind, the present invention provides a device which enables an operator to set up the press brake gauges or stops accurately without the necessity for several trials.

More specifically, the present invention provides a device having an adjustment for the desired flange height, and an independent adjustment which automatically compensates for metal thickness and bend allowance and in which the latter adjustment may be made independently of the former adjustment.

The invention also provides a device which automatically finds the longitudinal center line of the dies to effect proper adjustment of the gauges or stops thereof.

The invention provides a gauge setting device which is of simple construction and yet is fully effective in operation and use.

All the objects of the invention and the various features and details of the construction and operation thereof are more fully set forth hereinafter with reference to the accompanying drawing wherein Fig. 1 is a plan view of a gauge-setting device made in accordance with the present invention;

Fig. 2 is a view in side-elevation with portions broken away showing the device of Fig. 1;

Fig. 3 is an inverted plan view at a reduced scale of the device shown in Figs. 1 and 2;

Figs. 4 and 5 are longitudinal and transverse sections taken on lines 4—4 and 5—5 respectively, of Fig. 1;

Fig. 6 is a perspective view of the device of Fig. 1 showing a magnifying rim mounted thereon;

Fig. 7 is a fragmentary plan view of the lower die of a press brake showing a device of the present invention applied thereto for setting a gauge or stop thereon;

Fig. 8 is a sectional view taken on line 8—8 of Fig. 7;

Fig. 9 is a view similar to Fig. 8 but showing the device of the present invention removed and a sheet of material in place therein, the broken lines showing the operation of the press brake; and Fig. 10 is a view showing the flange formed by the operation of the press brake in Fig. 9.

Referring now to the drawings, the gauge setting device comprises a housing 12 having a recess 13 therein which serves as a guide for a slide element 14. Guide pieces 22 and 23 are provided to overlie the recess 13 and retain the slide element 14 in position within the recess. The slide element 14 adjustably mounts a rule or other measuring device 15 therein, the forward edges of the slide element at 16 serving as an index for registry with the scale on the rule 15, the edge 16 indicating the desired flange height to be formed in the press brake. Means is provided at 17 to lock the rule 15 in position in the slide element 14. An adjusting screw 18, is provided to adjust the slide 14 in the recess 13 in accordance with the gauge or thickness of the sheet material. To this end indicia or scales are provided on the housing at 19 and 20 with which the forward edge of a shoulder 21 on the slide element 14 registers.

As shown at 54 in Fig. 6, a magnifying glass may be mounted on the device to facilitate reading the indicia or scales at 19 and 20 and registration of the shoulder 21 with the proper index.

In the present instance, the indicia at 19 and 20 are calibrated in terms of the gauge of the metal. When the shoulder 21 is registered with the index "0" of the scales at 19 and 20, the leading edge 16 is in precise registry with the forward face 25 of the housing, which serves as a reference plane for the device. When the shoulder 21 is registered with a given gauge number, the leading edge 16 of the slide element 14 is displaced from the forward face 25 of the housing 12 a distance to compensate for the thickness of metal of the selected gauge and the square bend allowance for that gauge of metal. Thus the device measures between the face 25 and the end 15a of the rule, the distance from the end of the flange to the center of the bend (indicated at A—X in Fig. 10) to provide a flange of a given height (indicated at A in Fig. 10).

In the present instance, the locking means 17 for the rule 15 comprises a thumb screw 30 threaded in the slide element 14 as indicated at 31 and engaging a locking button 32 slidable vertically in the slide element 14. As shown in Figs. 4 and 5, the slide element 14 is formed with an open-ended slot 33 in which the rule 15 is slidable. It is apparent that the resulting thumb screw 30 unlocks the rule 15 in the recess 33 and permits sliding adjustment of the rule to register the index 16 with the proper point on the rule. It is understood that the rule 15 need not be a scale as shown, but may be a measuring device of any suitable form, for example, a piece of metal stock scribed to indicate the desired flange height.

The adjusting means at 18, in the present instance, comprises a threaded shaft 35 having a reduced section at 36 journaled in an aperture in the housing 12. A thumb screw is provided at 37 to axially immobilize the shaft 35 relative to the housing, so that upon rotation of the shaft 35, the slide element is displaced due to the threaded engagement of the shaft 35 in the slide element 14. The simple screw adjustment afforded by this construction enables accurate registry of the shoulder 21 with the proper one of the indicia at 19 and 20.

In accordance with the invention, means is provided in the housing 12 to register the forward face 25 with the center line of the forming dies of the press brake. To this end, the lower surface of the housing 12 is formed with recesses 42 arranged in pairs on opposite sides of the slide element 14. Magnetic means in the form of magnets 43 are mounted in the recesses 42, for example by bolts 44, the magnets being positioned to engage the upper surface of the lower die of the press brake, for example as shown at 46 in Figs. 7 and 8. The magnets 43 are coplanar and mount the face 25 perpendicular to the upper surface of the die 46.

In accordance with the invention, means is provided to register the face 25 with the longitudinal center line of the die 46, and to this end centering pins or pointers 48 are provided on opposite sides of the housing 12. The pins 48 are mounted coplanar with the face 25 and are mounted for vertical axial movement within said plane by means of a body portion 49 slidable in a cylindrical recess 50. The pointers 48 are biased outwardly by a spring 51 seated at one end in the body member 49 and at the other end in a cap 52 threadably engaged in the recess 50. Of course, the force of the bias of the springs 51 is less than the magnetic force of the magnets 43. When the magnets 43 are engaged with the upper surface of the die 46, the centering pins 48, by reason of the bias provided by the spring 51, find the center of the angle recess of the die 46 and thereby align the face 25 with the longitudinal center line of the die. Since the face 25 is registered with the longitudinal center line of the die, the free end 15a of the rule 15 indicates the proper position for the gauge or stop for the lower die.

It is noted that at the opposite sides of the housing 12, it extends forwardly beyond the face 25 to mount the magnets 43 forwardly of the face 25 to enable them to span the angle recess in the die 46. By this construction, when the device is mounted on the lower die, the gauges or stops may be positioned within the confines of the housing as close to the face 25 as desired.

In the operation of the device, the flange height and metal gauge are registered on the device as described above. The device is then placed on the die 46, as shown in Figs. 7 and 8, with the centering pins 48 engaged in the angle recess of the die to register the face 25 with the longitudinal center line of the die. The magnets 43 retain the tool in place with the free end 15a of the rule 15 in the path of movement of the gauge or stop 56 on the bracket 57. The device is used to adjust each of the stops 56 of the die 46, and when this is accomplished the device is removed and the work 58 which is to be bent is placed on the die 46 in engagement with the stops or gauges 56, as shown in full lines in Fig. 9. The upper die 59 is then displaced into engagement with the material 58 to bend it to the form shown in broken lines in Fig. 9 at 58a, the upper die assuming the position indicated in broken lines at 59a. The press brake therefore forms a flange 60 having a dimension A precisely equal to the setting determined by the setting device, allowance having been made for the thickness of the material and the bend allowance.

While a particular embodiment of the present invention has been herein illustrated and described, it is not intended to limit the invention to such disclosure but changes and modifications may be made therein and thereto within the scope of the following claims.

I claim:

1. A device for setting stops on a flange-bending die to provide a desired flange length for a work material comprising a housing having a recess, mounting means to mount a reference plane of said housing coplanar with the longitudinal center line of the die, a slide element mounted in said housing recess for movement perpendicular to said plane, said slide element having a plurality of settings in said housing each corresponding to the necessary compensation for the thickness and the bend allowance for a given material, and a rule mounted in said slide element and having one end projecting outwardly therefrom perpendicular to said plane to engage the stops of the flange-bending die, said rule being marked at a distance from said one end equal to the desired flange length, said mark registering with said plane of said housing when said slide element is positioned at its zero setting, and being displaced therefrom to compensate for the thickness and the bend allowance for the work material when said slide element is adjusted to the setting for said material.

2. A device according to claim 1 wherein said index to register with said mark is positioned on said slide element and is adapted to register with said reference plane when said slide element is at the zero setting, whereby the setting of the slide element may be maintained while changing the rule mounting for the desired flange length.

3. A device according to claim 2 wherein said rule is mounted for independent longitudinal adjustment in said slide element whereby the desired flange length can be changed without disturbing the setting of said slide element for the necessary compensation.

4. A device according to claim 1 wherein said mounting means comprises magnetic means in the lower surface of said housing for engaging the upper surface of the flange-bending die, and at least two parallel centering pins projecting below said magnets coplanar with said plane to engage in the bottom of the angle groove of the die and thereby to center the plane relative to said die.

5. A device according to claim 4 wherein said centering pins are mounted for vertical sliding displacement in said housing and including means to bias said pins outwardly of said housing, the force of said biasing means being less than the magnetic force of said magnetic means.

References Cited in the file of this patent

UNITED STATES PATENTS

| | | |
|---|---|---|
| 660,005 | Davis | Oct. 16, 1900 |
| 804,067 | Stowe | Nov. 7, 1905 |
| 809,037 | Walker | Jan. 2, 1906 |
| 2,010,215 | Breitenstein | Aug. 6, 1935 |
| 2,466,685 | Cole | Apr. 12, 1949 |
| 2,484,801 | Anderson | Oct. 18, 1949 |
| 2,684,538 | Noe | July 27, 1954 |

FOREIGN PATENTS

| | | |
|---|---|---|
| 202,837 | Australia | June 23, 1955 |